United States Patent [19]

Brandkamp

[11] Patent Number: 5,313,311
[45] Date of Patent: May 17, 1994

[54] HYBRID MECHANICAL AND ELECTRONIC DESKEW OF SCANNED IMAGES IN AN IMAGE INPUT TERMINAL

[75] Inventor: Warren F. Brandkamp, Webster, N.Y.

[73] Assignee: Xerox Corporation, Stamford, Conn.

[21] Appl. No.: 995,732

[22] Filed: Dec. 23, 1992

[51] Int. Cl.$^5$ .............................................. H04N 1/04
[52] U.S. Cl. .................. 358/474; 358/475; 358/468; 358/448; 382/45
[58] Field of Search .............. 358/452, 453, 443, 488, 358/486, 474, 475, 468, 448; 382/46, 9, 18, 45; H04N 1/04

[56] References Cited

U.S. PATENT DOCUMENTS

| | | | |
|---|---|---|---|
| 3,812,459 | 5/1974 | MacNeill | 382/46 |
| 4,435,837 | 3/1984 | Abernathy | 382/45 |
| 4,604,161 | 8/1986 | Araghi | 156/645 |
| 4,916,483 | 4/1990 | Thompson et al. | 355/75 |

OTHER PUBLICATIONS

A. W. Paeth, "A Fast Algorithm for General Raster Rotation", Graphics Interface '86, p. 77ff. (1986).

Primary Examiner—Mark R. Powell
Assistant Examiner—Jerome Grant, II
Attorney, Agent, or Firm—Mark Costello

[57] ABSTRACT

In an image input terminal for deriving an electronic representation of the image, including a platen for supporting a document to be scanned, a scanning system including an illumination source for illuminating a document supported on the platen, an array of photosensitive elements which produce an electrical response to sensed reflected light, an arrangement for directing light reflected from a document to the linear array, and an arrangement for providing relative motion in a slow scan direction between the linear array of photosensitive elements and the document, there is provided an arrangement for rotating the scanning system of photosensitive elements and an illumination source about a rotational axis, by an amount corresponding to detected skew of the image, so that, upon relative movement of the linear array of photosensitive elements and the document, the effects of skew in the slow scan direction are removed from the electronic representation of the image. The scanned image still contains a component of skew in the slow scan direction. Accordingly, each pixel is shifted in the fast scan direction by an amount corresponding to the position of the scan line with respect to a start of page signal.

3 Claims, 9 Drawing Sheets

NO SKEW

FAST SCAN DIRECTION

HYBRID MECHANICAL AND ELECTRONIC DESKEW OF SCANNED IMAGES IN AN IMAGE INPUT TERMINAL

The present invention is directed to deskew of images at an image input scanner, and more particularly to a hybrid mechanical and electronic apparatus for deskew of scanned images.

BACKGROUND OF THE INVENTION

Raster input scanner (RIS) systems have become a scanner of choice for electrophotographic and desktop printers. Typically, the RIS comprises a linear array of photosensitive elements or sensors mounted in optical alignment with a lens or a linear lens array. A document is illuminated by a linear light source, and a line-by-line scanning function is accomplished by the RIS with the image being detected and stored electronically. Outputs from the photosensitive array may be sent to a raster output scanner (ROS) which forms a modulated output pattern on a charged photoreceptor device or belt. Alternatively, the output may be used to drive other image-forming devices such as ink jet printers and the like, or may be sent to a remote location to be stored, for example, in a data processor.

Skewed images in RIS systems such as, for example, the Xerox DocuTech Production Publisher or the Xerox 7650 Scanner, are a common problem. While the skew of a copied image is always undesirable, in electronic imaging additional image quality defects occur, particularly jaggies or stair steps, noted whenever a line is drawn or skewed so as to be at angles other than 0° or 90°. In electronic images, skew arises in cases where 1) the information on the original document is skewed with respect to a document edge; 2) trapezoidal or other non orthogonally cut sheets; 3) document handler skew; and 4) anamorphic skew caused by non-orthogonal slow or fast scan imaging.

There are workaround methods of solving certain skew problems, although none are desirable. For class 1) and 2) skew problems, typical methods of correcting skew are to reposition an original document on a scanning platen, and re-acquire the image. Commonly, a platen cover or document handler is opened, the document is manually repositioned on the platen, and re-scanned. Obtaining proper document positioning can be a slow and laborious trial and error method, requiring a proof copy after each adjustment. It is also a common experience that the movement of air caused by the closure of the platen cover causes document movement. In U.S. Pat. No. 4,916,483, small angle document rotation (skew angles are usually small) is accomplished by arranging a rotating document hold down arrangement, which frictionally engages a document in controlled manual rotation, whereupon the image may be re-scanned at the correct angle. Unfortunately, the linkage allowing mechanical rotation does not lend itself to use in an automatic document handler. Additionally, the trial and error rescanning process is still required, as the rotator does not provide positional feedback. Class 3) problems cannot be resolved in this manner, since to do so would require interrupting the document handler. The class 4) problem is unique among the deskew causes, since it is a function of the image acquiring device, as opposed to the orientation of the document.

Certain image processing methods exist which provide small angle rotation (which is characteristic of document skew), as described for example in "A Fast Algorithm for General Raster Rotation", Graphics Interface '86, A. Paeth, p. 77 ff. (1986). However, such methods require some alteration of the image, and may cause image defects. Most image processing methods for rotation are memory intensive, and would slow copy production.

All of the references cited herein are incorporated by reference for their teachings.

SUMMARY OF THE INVENTION

In accordance with the invention in an image input terminal for deriving an electronic representation of an original document there is provided a hybrid method of deskewing the document, in which the scanning system is rotated in accordance with an amount of detected skew for acquisition of the image, and an image processing technique is used to complete the deskew process.

In accordance with one aspect of the invention, in an image input terminal for deriving an electronic representation of the image, which includes a platen for supporting a document to be scanned; a scanning system including means for illuminating a document supported on the platen, an array of photosensitive elements which produce an electrical response to sense reflected light, and means for directing light reflected from a document to the array; and means for providing relative motion in a slow scan direction between the linear array of photosensitive elements and the document, there is provided means for rotating the scanning system about a rotational axis, by an amount corresponding to detected skew of the image, so that, upon relative movement of the scanning system and documents, the effects of skew in the fast scan direction are removed from the electronic representation of the image. The scanned image still contains a component of skew in the slow scan direction. Accordingly, each pixel is shifted in the fast scan direction by an amount corresponding to the position of the scan line with respect to a start of page signal.

These and other aspects of the invention will become apparent from the following descriptions to illustrate a preferred embodiment of the invention read in conjunction with the accompanying drawings in which.

Figure 13:
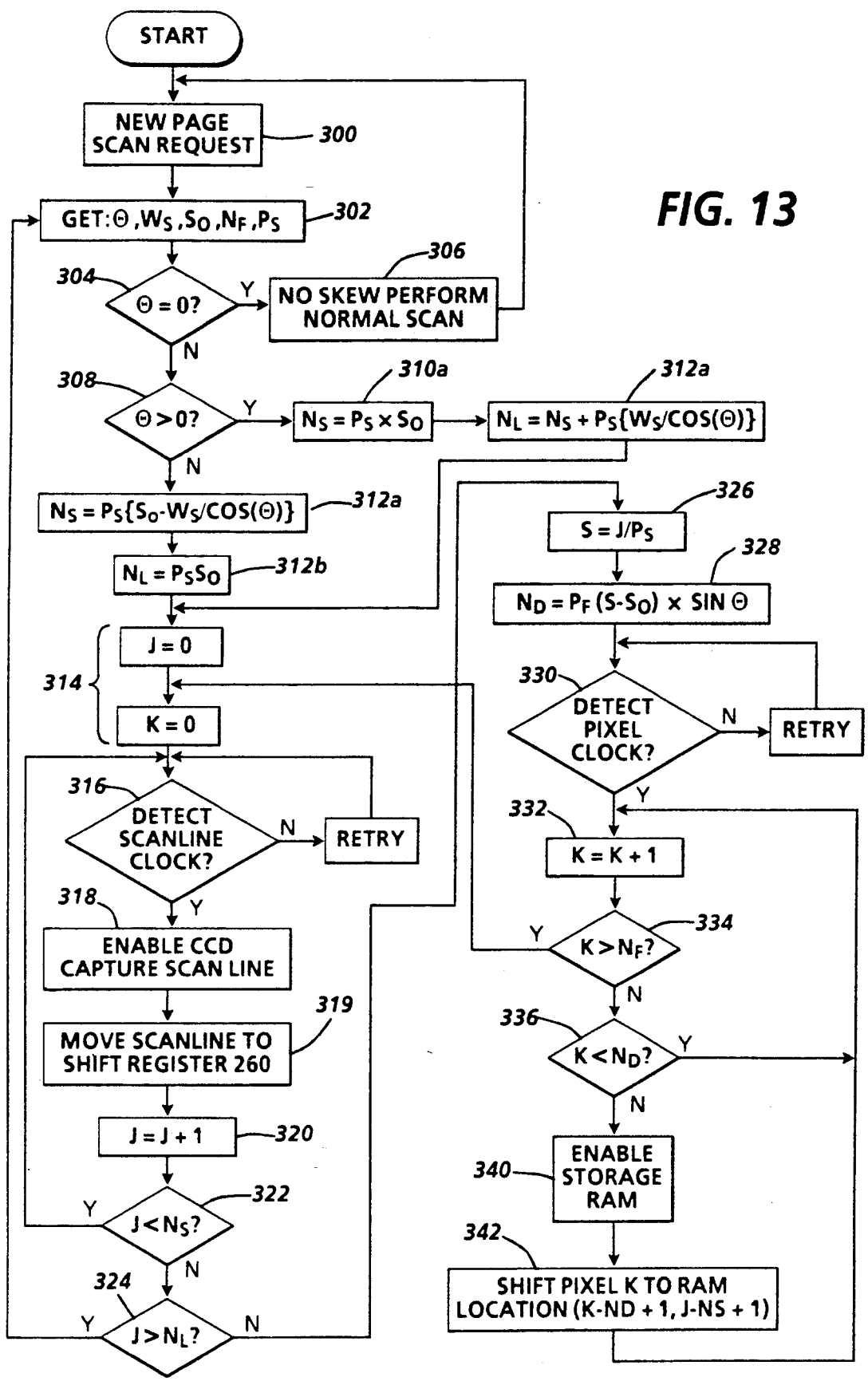

FIG. 13 provides a flow chart of the pixel shifting for fast scan direction correction.

Figure 1:
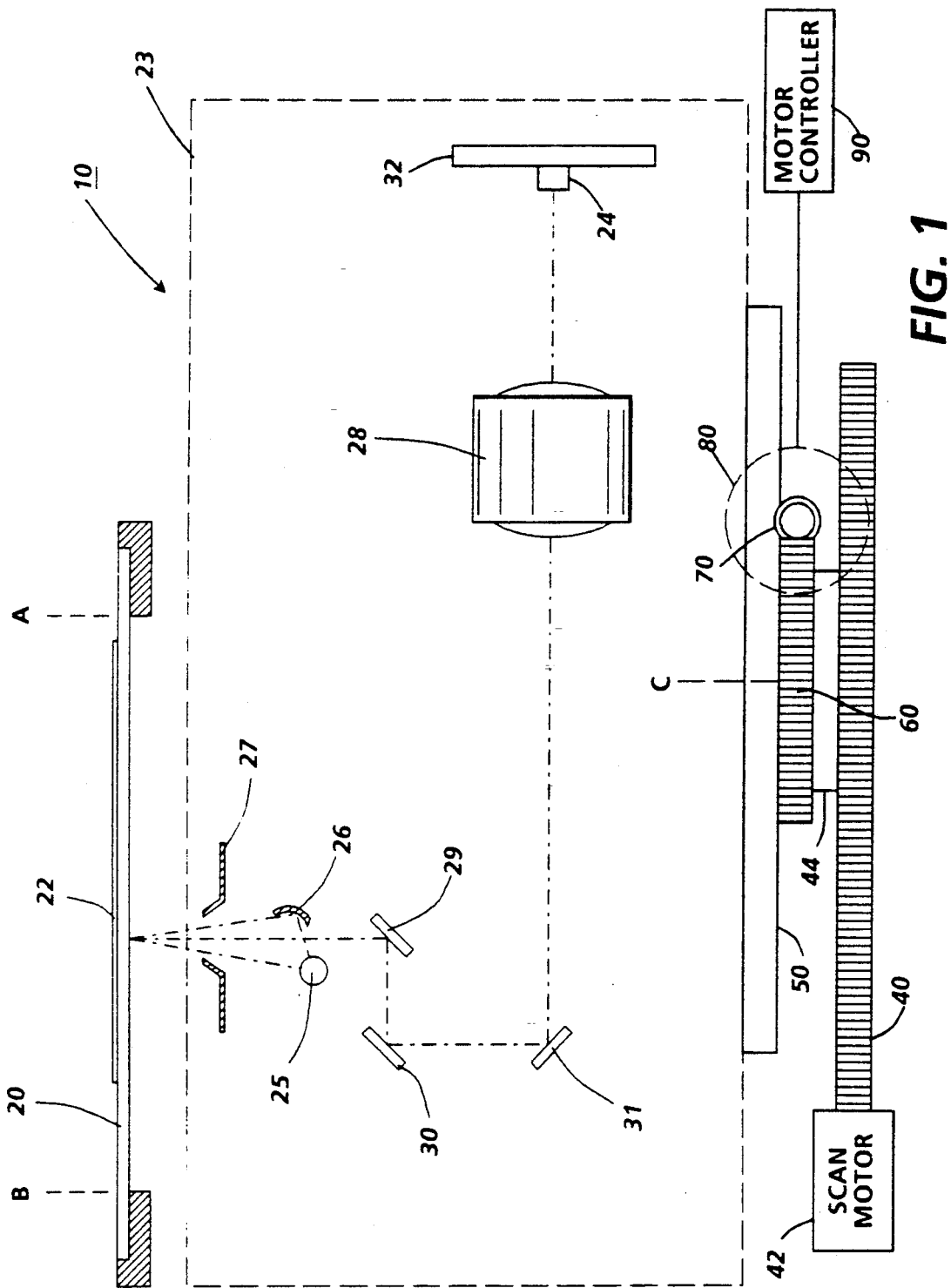
FIG. 1 shows a scanning arrangement including a moving scanning carriage for illuminating a document on a platen, and directing reflected light to an linear array of photosensitive elements.

Referring now to the drawings where the showings are for the purpose of describing an embodiment of the invention and not for limiting same, FIG. 1 shows a raster input scanner 10 in accordance with the invention for generating an electronic representation of an image on a document. As used hereinafter, "document" refers to an image bearing original from which copying is desired. Documents may comprise image supporting substrates, such as cut sheets of paper, transparencies or other individual pieces of flimsy material, unburst computer forms forming a continuous length of material, or any image bearing substrate from which copying is desired. When necessary, the type of document for which the description finds use will be described with greater particularity. "Image" as used herein refers to the information on the document, for which scanning is desired, and which will be in some manner copied to another substrate or to an electronic storage medium. "Scanning" as used hereinafter, refers to the relative movement of photosensitive sensors with respect to documents for the purpose of acquiring an electronic representation of the image or information about the image.

Referring to FIG. 1, a scanner incorporates a transparent planten 20 on which a document 22 to be copied is located. One or more photosensitive element linear arrays 24 are supported for reciprocating scanning movement below platen 20. A scanning system assembly 23 together comprises a plurality of optical components which move together as a single unit, driven via lead screw 40, which is in turn driven by a scanning drive motor 42. The components include a linear, fluorescent lamp 25, associated reflector 26, and baffle 27, the latter two elements cooperating to direct a narrow band of light onto an incremental area of the platen. Also included in assembly 23 are lens 28, and mirrors 29, 30, and 31, which cooperate to focus the illuminated segment of platen 20 and the document being scanned thereon, onto array 24. Array 24 produces image signals or pixels representative of the image scanned which are output to a printer, display or storage device.

Array 24 is supported on scanning array support member 32, a relatively rigid member supported in assembly 23. Scanning array 24 may be a linear array of photosensitive sensors such as CCD's or photodiodes which are controlled to sense light reflected from a document during an integration period. The photosensitive sensors develop a charge indicative of the amount of light detected, for transmission to an image processor for use in assimilating an electronically stored representation of the image on the document. The scanning array is arranged with the array extending in a direction transverse to the direction of carriage motion, so that the carriage motion direction forms the slow scan axis of an image, while the array extends in the fast scan direction of the image.

Commonly, a lead screw drive arrangement 40 may be used to provide relative motion between array 24 and document 22. Scanning takes place from start of scan position A to end of scan position B.

Scanning system 23 is supported on rotational support plate 50 to allow driven movement thereof, as will be further explained, in a 360° rotation, about an axis C. In one possible embodiment, support member 50 is driven in its rotational movement by a transmission arrangement including a worm gear 70, coupled with support member 50, and coupled via a complementary driven gear 60 to a motor 80, which is controllably driven in accordance with a motor controller 90, to which motor control signals indicating skew driving requirements are directed. Timing belts and other transmission systems may also operate suitably. A rotation assembly/scan drive assembly interface plate 44 may provide an appropriate coupling of the scanning assembly (23, 50, 60, 70 and 80) with lead screw drive 40 and motor 42.

Figure 2:
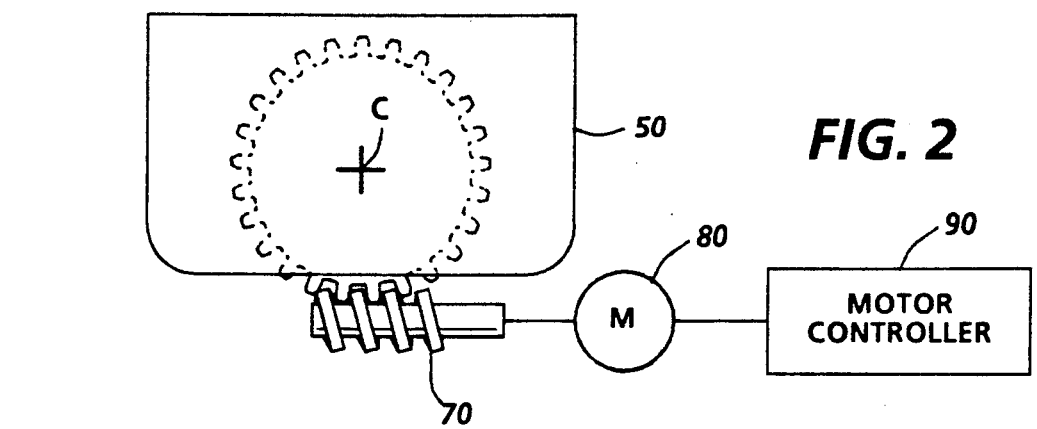
FIG. 2 illustrates the scanning element rotators of FIG. 1.

FIG. 2 shows a different view of support plate 50, to further illustrate the rotational motion about axis C of the scanning system (not shown in FIG. 2).

Figure 3:
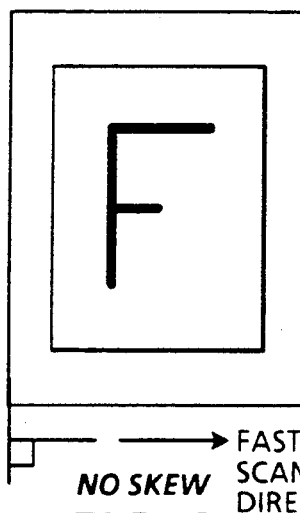
FIGS. 3-6 show the effect of the invention on an image.
Figure 5:
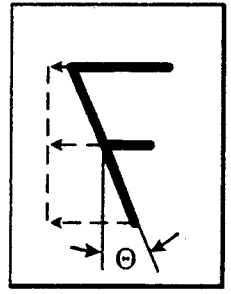
Figure 6:
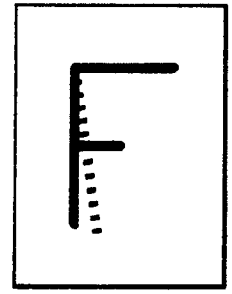
Figure 4B:
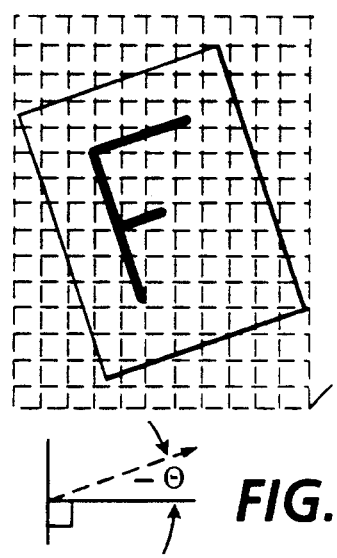

Once skew is known, the image may be rescanned, without movement of the document. The rescanning is accomplished after scanning system 23 is rotated, determined in the skew determination step. With reference now to FIGS. 3-6, a series of examples are shown, with FIG. 3 showing the alphanumeric F on a document positioned on the platen without skew, and FIG. 4B showing the alphanumeric F on a document positioned with skew of angle-$\theta$. If the scanning system is rotated by an angle-$\theta$, determined in the skew determination step, and the skewed document of FIG. 4B is scanned, the image of FIG. 5 will be derived. FIG. 5 shows that the fast scan axis of the image has been deskewed, but the slow scan axis has not been deskewed. The next step in the process, illustrated in FIG. 6, is to deskew the slow axis of the image by shifting pixels along the fast scan axis in accordance with their position on the page to obtain the corrected image.

Detection of skew of the document on platen 20 with respect to a nominal fast scan and slow scan axis can be accomplished in a number of ways. A trial and error method might be employed, whereby a skew magnitude is entered into the system via an appropriate user interface, allowing the entry of such information, to rotate the linear array of photosites. A copy of the document is made, and examined for skew, with the process iterated until satisfaction is obtained.

Figure 4A:
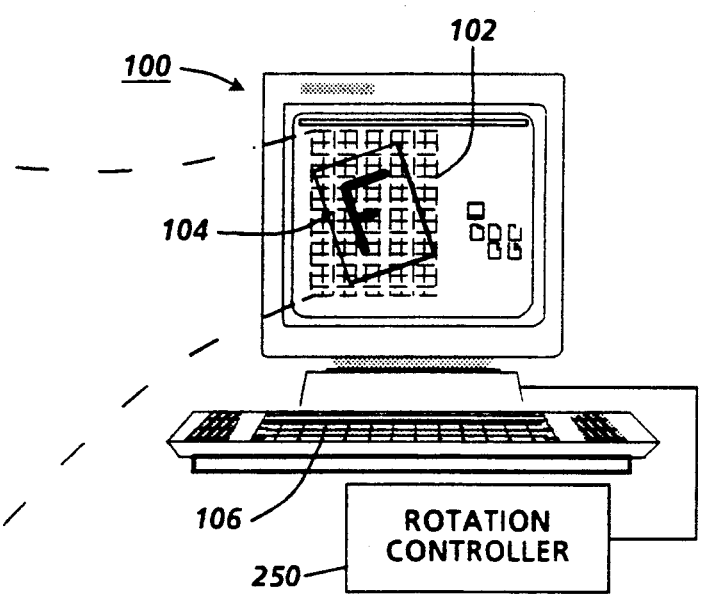

If the system provides display of the scanned image, the operator can view the scanned image on a workstation 100, including a display 102, as shown in the example of FIG. 4A and 4B, and make a user decision about the amount of skew to be removed, perhaps by reference to a simultaneously displayed grid 104 or other skew comparing arrangement. Such information may then be input into the system via an appropriate user interface 106, allowing the entry of such information.

Alternatively, the operator may print a copy of the image, and measure the skew of the printed image with reference to a superimposable grid, such as a simple protractor, and make a user decision about the amount of skew to be removed. Such information may then be input into the system via an appropriate user interface, allowing the entry of such information.

Figure 7:
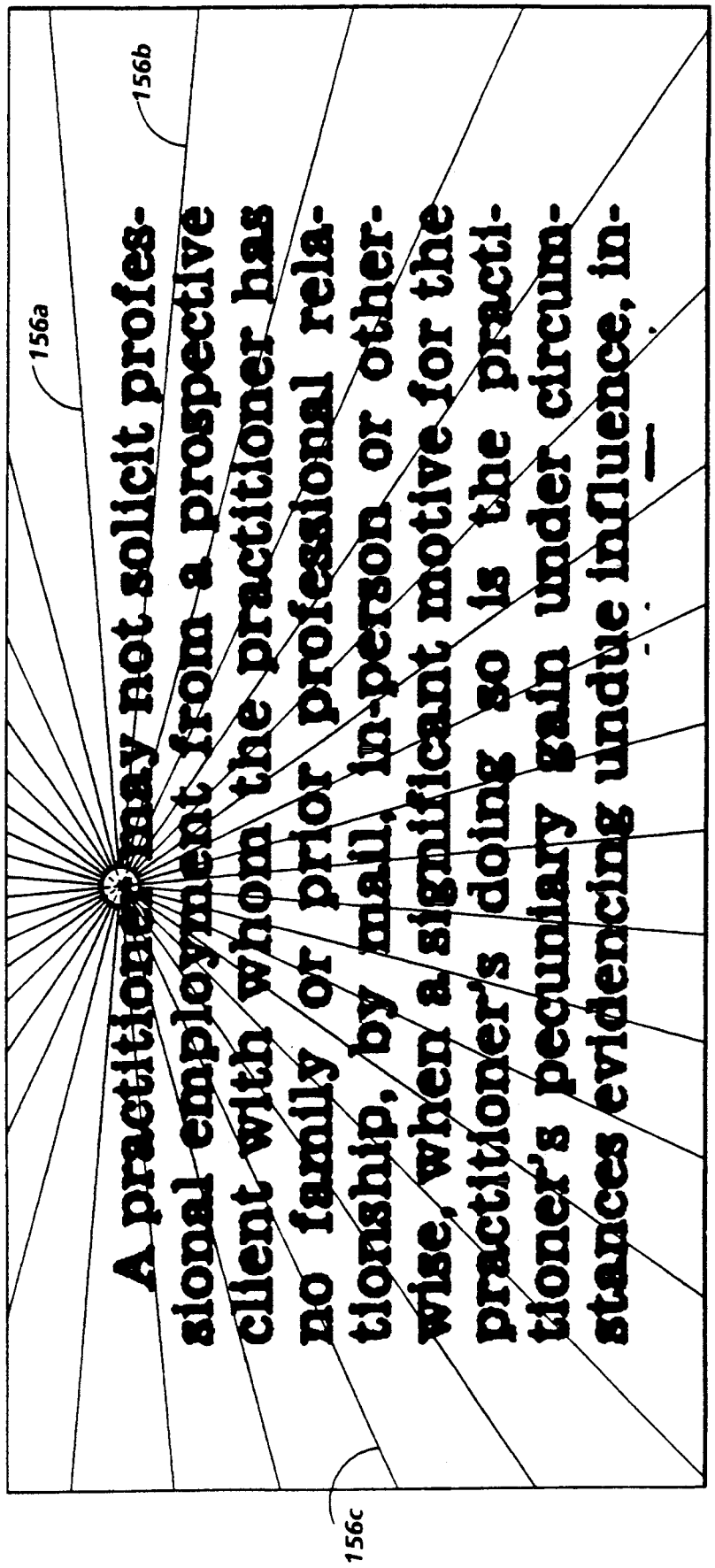
FIGS. 7-10 show one possible deskew angle measurement method, applicable to text.
Figure 8:
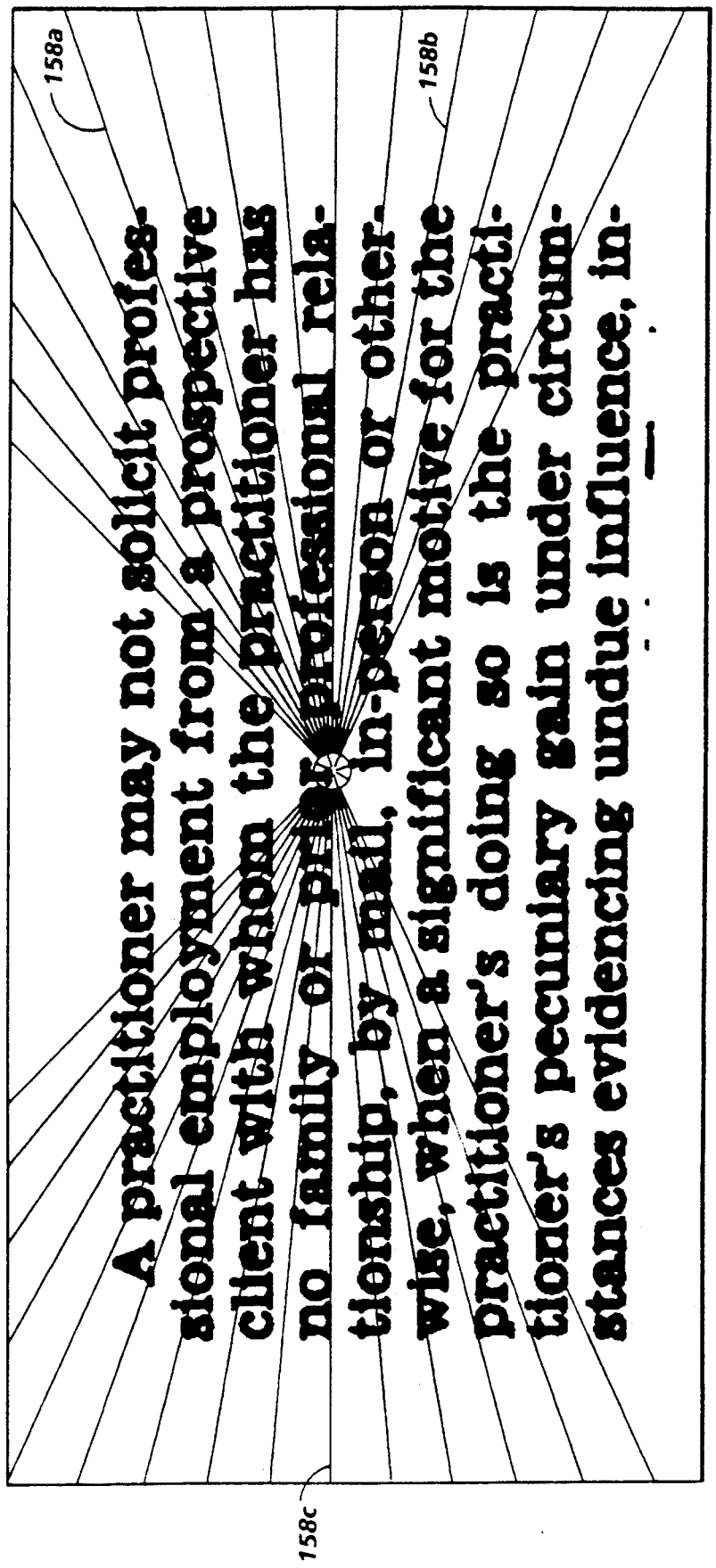
Figure 9:
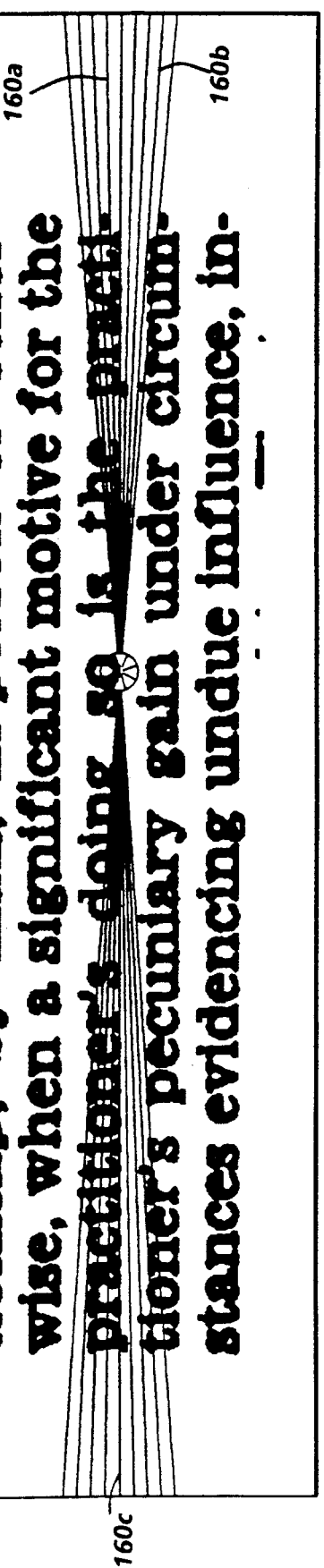
Figure 10:
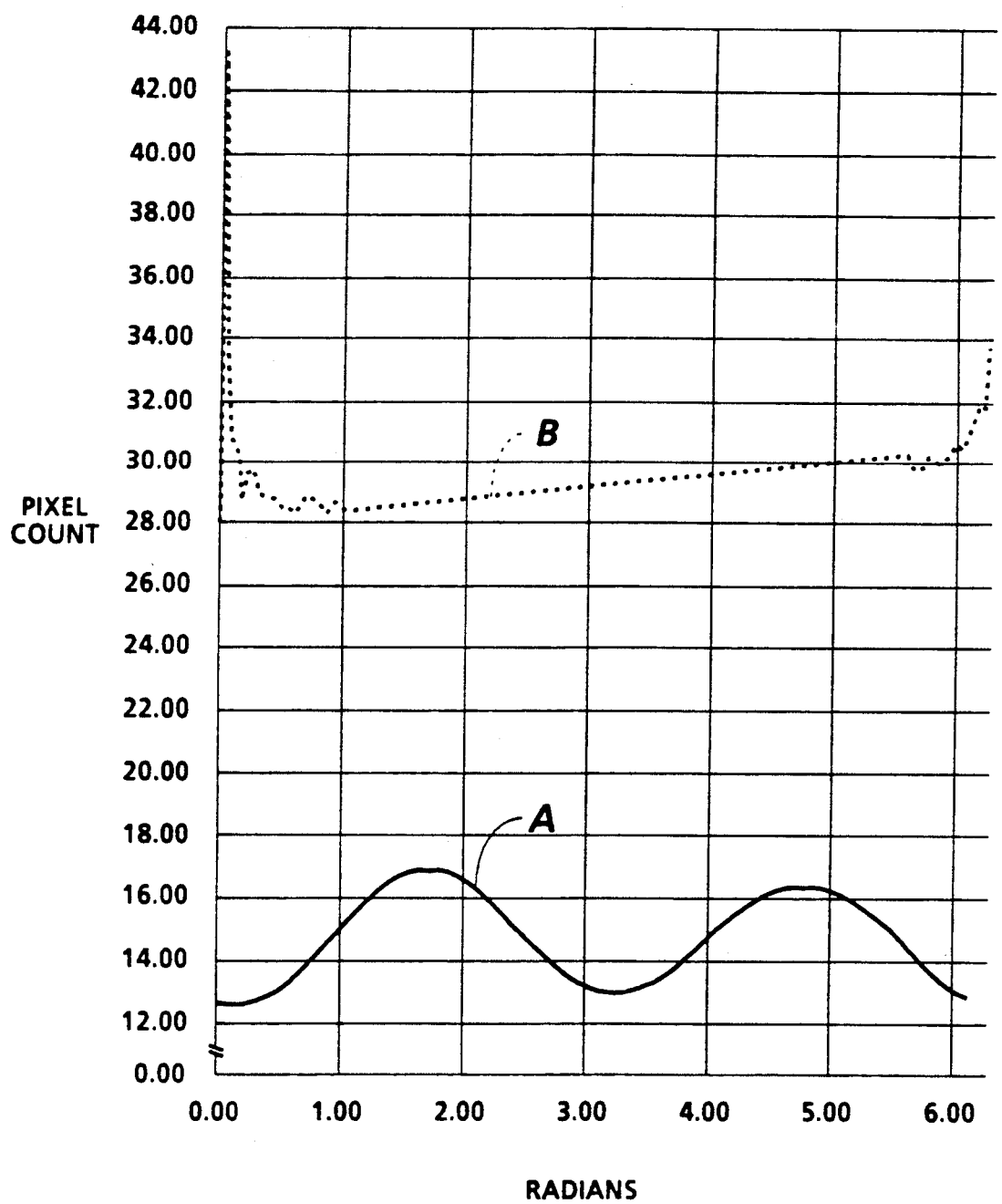

In one highly automated arrangement, where the image includes text, the image may be directed to a computer workstation, or similarly programmable microprocessor operating in accordance with a proprogrammed routine as described in "Coarse and Fine Skew Measurement", Wayner et al., Ser. No. 07/737,863 filed Jul. 30, 1991, and assigned to the same assignee as the present invention and herein incorporated by reference. This method determines the orientation of text lines in the image, looks at a small number of randomly selected edge pixels (defined as a black pixel adjacent to at least one white pixel), and for each edge pixel considers, at FIG. 7, a number of lines, 156a, 156b, 156c being examples, extending from the pixel at evenly spaced angular increments over a specified range of angles. The edge pixels are selected randomly from the set of all image pixels. FIGS. 7 (see lines 156a, 156b, 156c), 8 (see lines 158a, 158b, 158c), and 9 (see lines 160a, 160b, 160c) represent a series of increasingly smaller angular ranges over which the above-mentioned technique is applied to illustrative edge pixels to accurately determine the angular orientation of the text within the image. Subsequent to finding edge pixels and defining the lines, the method traces the path of each line, determining the lengths, in pixels, of strings of successive black pixels which are intersected by the line. Upon reaching the image boundary, an average black pixel string length is calculated by summing the lengths of the individual strings, and dividing the sum by the total number of distinct strings which were found. This operation is carried out for all the lines, thereby arriving at an average black pixel string length for each line extending from the selected edge pixel. These lengths are plotted on FIG. 10 as curve A, showing minima at approximately 0 and 3.14 radians. Curve A is a graphical representation of the summation-/averaging function over each of a series of angled lines extending from the edge pixel, and spread over a range from 0 to $2\pi$ radians. Once a first minimum has been located, verification of the minimum (in the example, approximately 0 radians) is achieved by determining whether a second minimum exists at approximately $\pi$ radians from the first minimum. Upon verifying the existence of a second minima (in the example, approximately 3.14 or $\pi$ radians), a coarse skew angle is identified. Subsequently, it is necessary to more closely determine the skew angle of the text. This is accomplished by utilizing a number of lines which extend from a randomly selected edge pixel, where the lines differ by smaller angular increments, and the angular range is centered about the coarse skew angle. However, the fine skew angle may be determined by analyzing the total number of black pixels contained along a predetermined length of the lines. More specifically, the number of pixels over a unit distance is plotted as curve B on FIG. 10, and the fine skew angle is determined by identifying the maxima of the curve. In other words, the point of the curve where the highest concentration of black pixels per unit line length exists, more accurately represents the angle of the text lines in the image. As shown by curve B, this results in a fine skew angle of approximately 0 radians, where the line intersects with the most black pixels along its length, and therefore is representative of the closest angle of orientation that needs to be determined.

Figure 11:
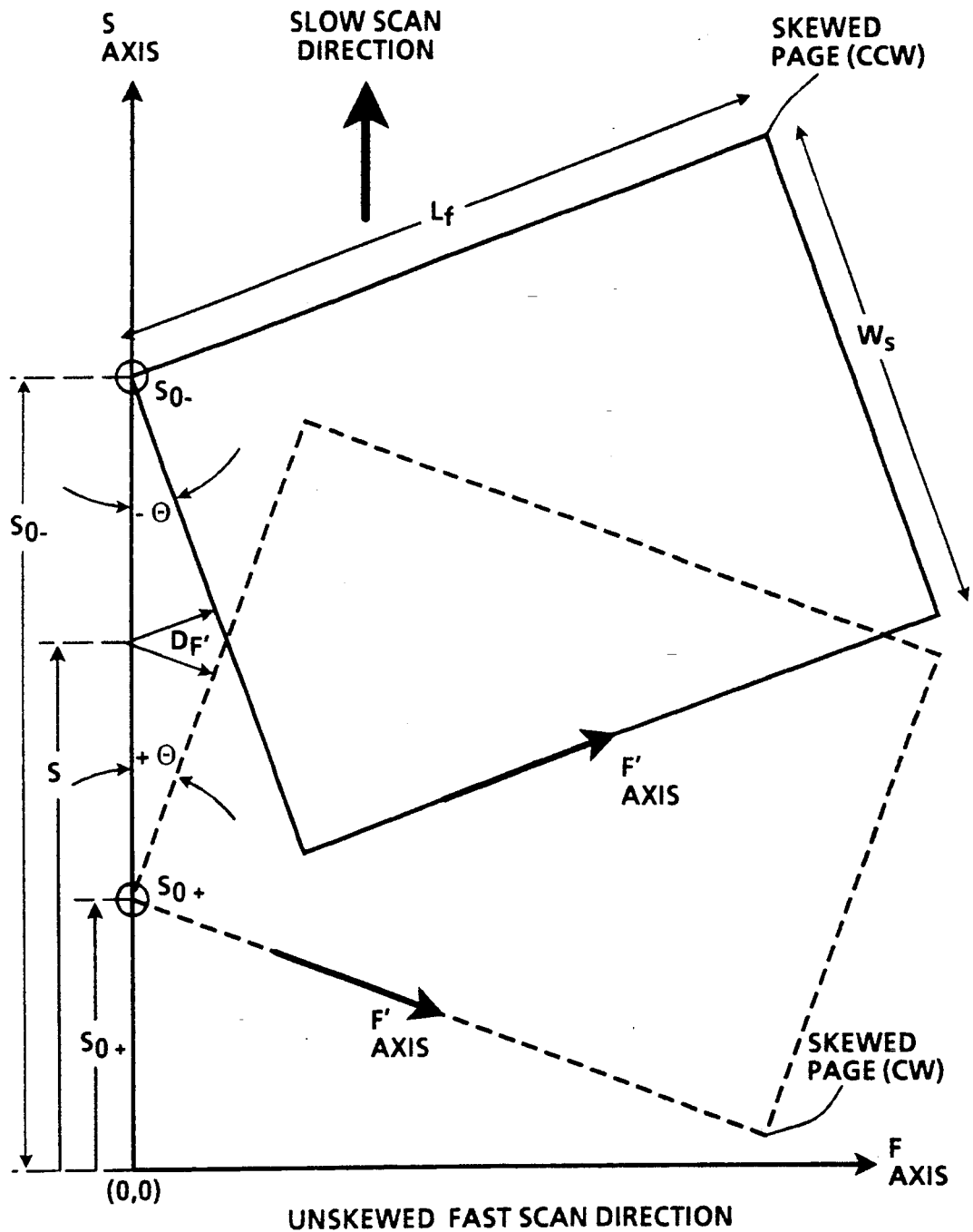
FIG. 11 shows a plan view of a document on a platen with appropriate orientation.

With reference now particularly to FIG. 11, we analyze the process of deskew. First, looking at the slow scan direction, identified as the S-Axis, scan velocity in the slow scan direction is $V_s$ (inches/second) The scanner resolution in the slow scan direction is $P_s$ (pixels/inch). A document to be scanned has dimensions $L_F$ (length in the fast scan direction) $\times W_S$ (width in the slow scan direction). The length of a pixel in the slow scan direction is given by $1/P_s$ (inches). It can be seen that the time required to scan an entire slow scan line, $T_s = 1/(P_s \times V_s)$. It can also be seen that for that to occur, the scan line clock frequency $F_s = 1/T_s$.

The length of the active scan line in the fast scan direction is given as $L_a$ (inches). The scanner resolution in the fast scan direction is $P_f$(pixels/inch). The number of active fast scan pixels is therefore $N_f = L_a \times P_f$. The scan line retrace (inactive) time is $T_R$. The active scan line time $T_a$ is therefore given as $T_s - T_R$. The serial processing time allowed for each pixel is $T_p = T_a/N_f$. The pixel clock frequency $F_{pc} = 1/T_p$.

Considering a skewed document, rotated about the point $(0, S_O)$ as given in FIG. 11, offset $D_F$ along the rotated fast scan axis is given by $$(S - S_O) \times \text{Sin}(\Theta)$$

where:
$D_F$ = The scan line offset in the rotated fast scan direction;
$\Theta$ = The skew rotation angle, where positive rotation is defined as clockwise;
S = The scan position along the slow scan axis;
$(0, S_0)$ = The page rotation coordinates along the slow scan axis. For counter clockwise rotation this is located at the top of the page (greater S-axis value), and for clockwise rotation this is located at the bottom of the page (lesser S-axis value);

The distance $N_S$ from the origin (0,0) to S measured in scan lines is given as $P_S \times S$. The number of fast scan correction pixels $N_D$ is given as $D_F \times P_f$.

Figure 12:
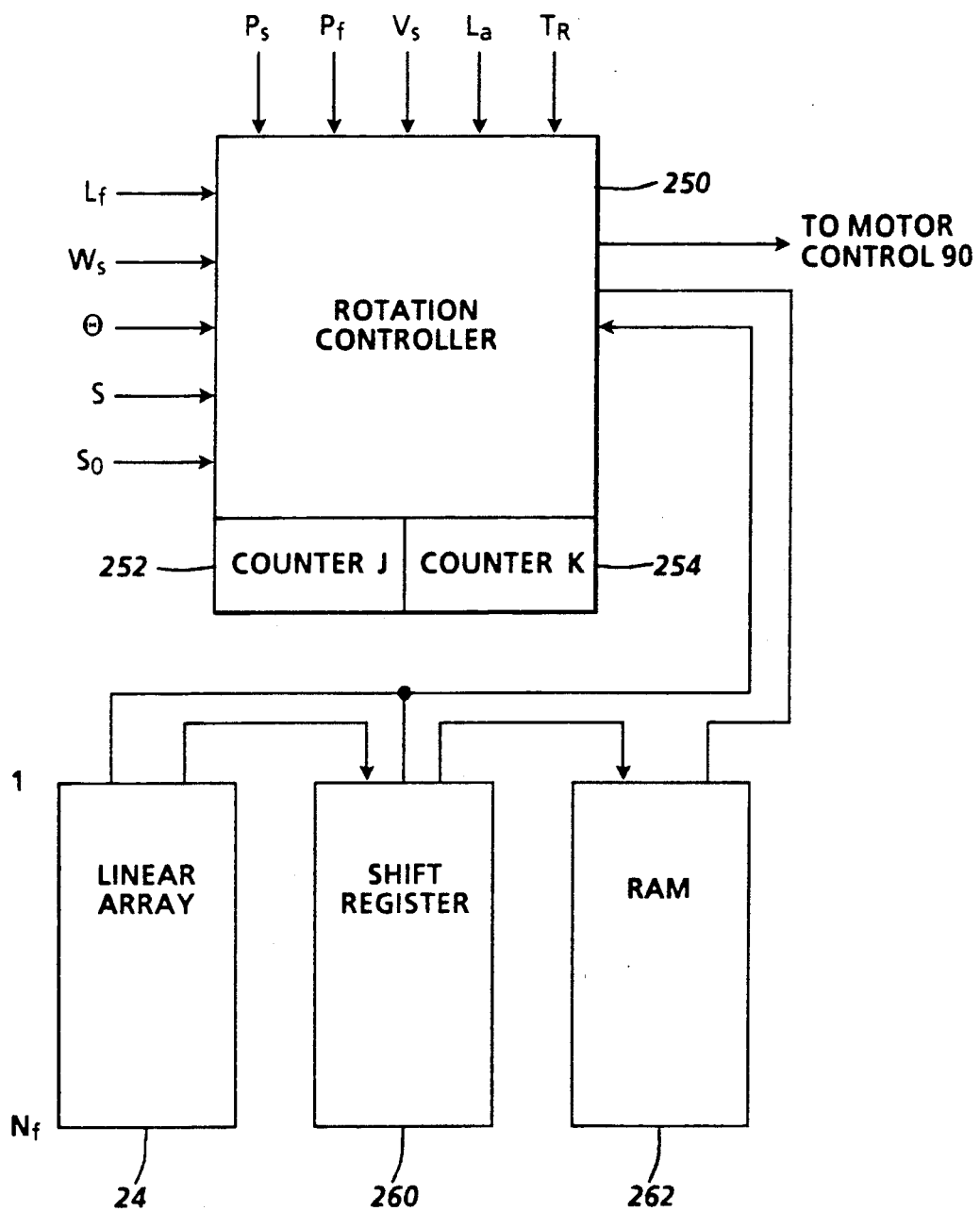
FIG. 12 shows a schematic of the required shift function.

With reference to FIG. 12, the shifting of scan line data is accomplished under the control of rotation controller 250. Rotation controller 250 is conveniently a microprocessor driven device, which operates in accordance with the process described in the flow chart of FIG. 13. For illustration purposes, it is shown with system inputs $P_f$, $P_S$, $V_S$, $L_A$ and $T_R$, which have values dictated by operating characteristics of the scanning device, and scanning parameters $L_F$, $W_S$, $\Theta$, S and $S_0$, which are either known or derived from a prescan of the document. Within, or operatively connected with rotation controller 250 are scan line counter 252, which provides a scan line count J at frequency $F_S$ and pixel counter 254 at frequency $F_{PC}$, which provides a fast scan pixel count K. Rotation controller provides control to motor control 80, to effect the rotation of the scanning system 23, as well as providing scanning control of array 24, to integrate and direct data therefrom to shift register 260, from which data will be gated to scan line RAM 262. Movement of the derived image signal or pixels from array 24 to shift register 260, and from shift register 260 to RAM 262, are respectively controlled by rotation controller 250, as will be described hereinafter.

With reference now to FIG. 13, a flow chart shows the process of shifting pixels in the fast scan direction, once image acquisition has occurred with the rotated linear array. Upon determining the page scan with the rotated array is started (step 300), variables $W_S$, $S_0$, $N_F$, $P_S$, $\Theta$ are input into the process (step 302). At decision 304, a determination is made as to whether $\Theta$ equals 0, indicating whether there is skew present. If no skew is present, at step 306, a normal scan is performed. At step 308, $\Theta$ is compared to 0, to determine the direction of skew, so that variables $N_S$ and $N_L$ may be set accordingly either at steps 310a and 312a or 310b and 312b. Next, counters J (scan line counter) and K (pixel counter) are initialized at step 314. At step 316, if the scan line clock indicates a new scan line should begin, array 24 is enabled to capture a scan line at step 318. The scan line is stored to shift register 260 at step 319, and counter J is incremented at step 320. At step 322, counter J is compared to $N_S$, the distance to the page origin in the scan line. If the counter value is less than $N_S$, another scan line is clocked in at step 316. If the counter value is greater than $N_S$, it is compared to $N_L$ at step 324. If this number is exceeded, the process is completed and returned to the new page scan request. Otherwise, the process is still within the document limits and continues. Assuming that the process is still within the document limits ($N_L > J > N_S$), at step 326, the position along the slow scan axis is determined by dividing the scan line counter value J by the resolution $P_S$. At step 328, the number of fast scan correction pixels added or subtracted to the line of data is determined by the function $P_f(S-S_0) \times (\sin \Theta)$.

At step 330, if the pixel clock is detected, K is incremented at step 332. If K is greater than $N_F$ (the maximum number of pixels in a scan line), a new scan line is acquired. Otherwise, at step 326, counter K value is compared to the corrected limits of the scan line $N_D$. If the pixel clock is within those limits, at step 340, image signals are passed to a storage RAM at step 342. Otherwise, at step 338, the storage RAM is bypassed and K is incremented in step 332. At step 342 the Kth pixel is stored to RAM location $(K-N_D+1, J-N_S+1)$. The process then continues for the K+1 pixel.

The invention may also apply to a scanning system including a full width array of photosensitive elements, in which light reflected from the document is focused on the array via a SelFoc-type Lens. Additionally, the goals of the invention may be accomplished by rotation of less than all of the elements of the scanning system 23.

The invention has been described with reference to a particular embodiment. Modifications and alterations will occur to others upon reading and understanding this specification. It is intended that all such modifications and alterations are included insofar as they come within the scope of the appended claims or equivalents thereof.

What is claimed is:

1. An image input scanner for deriving an electronic representation of a document including a platen for supporting a document to be scanned; a scanning system including an array of photosensitive elements which produce an ordered set of electrical responses to sensed reflected light, said array supported parallel to said platen and acquiring data across the document in a fast scan direction, a light source providing illumination of a document supported on the platen, and an optical system directing and focusing light reflected from a document to the array; means supporting the scanning system and providing relative motion in a slow scan direction between the scanning system and the document; and a deskewing system sensing skew of a document and providing a deskewed representation thereof, said deskewing system comprising:

a document skew detector measuring relative skew between the array and the document on the platen for scanning, and producing a measurement signal indicative thereof;
    said scanning system supported for rotation on the relative motion providing means, about an rotational axis perpendicular to said document;
    a drive means, for moving the scanning system in rotation about the rotational axis responsive to a control signal;
    a rotation controller, operative to control an amount of rotation of said scanning system in accordance with a skew measurement signal, whereby upon relative movement of the scanning system and the document in the slow scan direction, any skew effects in the direction of relative movement are removed from the electronic representation of the image; and
    said rotation controller also operative for shifting positions of derived electrical responses in the ordered set by a distance related to a position of the electrical response in the page, and the skew of the scanned document.

2. The device as defined in claim 1, wherein said means for shifting positions of the derived electrical responses in the ordered set by an amount related to a position of the electrical response in the page includes a calculating means for determining said position shift as a function of said skew measurement.

3. A method of correcting document skew at an image input scanner for deriving an electronic representation of a document including a platen for supporting a document to be scanned; a scanning system including an array of photosensitive elements which produce an ordered set of electrical responses to sensed reflected light, said array supported parallel to said platen, a light source providing uniform illumination of a document supported on the platen, and an optical system directing and focusing light reflected from a document to the array; means for providing relative motion between the scanning system and the document; and a deskewing system sensing skew of a document and providing a deskewed representation thereof, said method including the steps of comprising:

measuring relative skew between the array and the document on the platen for scanning, and producing a measurement signal indicative thereof;
    rotating the scanning system with respect to the relative motion providing means, about a rotational axis perpendicular to said document responsive to measured relative skew, whereby upon relative movement of the scanning system and the document in the slow scan direction, any skew effects in the direction of relative movement is removed from the electronic representation of the image; and
    shifting positions of derived electrical responses in the ordered set by a distance related to a position of the electrical response in the page, and the skew of the scanned document.

* * * * *